United States Patent
Chang et al.

(10) Patent No.: US 8,397,050 B2
(45) Date of Patent: Mar. 12, 2013

(54) SIMULATOR AND SIMULATING METHOD FOR RUNNING GUEST PROGRAM IN HOST

(75) Inventors: Xiao Tao Chang, Beijing (CN); Huayong Wang, Beijing (CN); Kun Wang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 12/633,299

(22) Filed: Dec. 8, 2009

(65) Prior Publication Data

US 2010/0161875 A1    Jun. 24, 2010

(30) Foreign Application Priority Data

Dec. 10, 2008  (CN) .......................... 2008 1 0185788

(51) Int. Cl.
    *G06F 12/10*  (2006.01)
(52) U.S. Cl. ........................ 711/207; 711/206
(58) Field of Classification Search .................. None
    See application file for complete search history.

(56) References Cited

U.S. PATENT DOCUMENTS

| | | | |
|---|---|---|---|
| 7,330,942 B2 | 2/2008 | de Dinechin et al. | |
| 7,500,048 B1* | 3/2009 | Venkitachalam et al. | 711/6 |
| 2006/0026383 A1* | 2/2006 | Dinechin et al. | 711/207 |
| 2006/0224816 A1* | 10/2006 | Yamada et al. | 711/6 |
| 2007/0057957 A1 | 3/2007 | Wooten | |
| 2008/0077765 A1* | 3/2008 | Illikkal et al. | 711/202 |
| 2008/0082696 A1 | 4/2008 | Bestler | |
| 2009/0313445 A1* | 12/2009 | Pandey et al. | 711/162 |

* cited by examiner

*Primary Examiner* — Than Nguyen
(74) *Attorney, Agent, or Firm* — Derek S. Jennings; Geil Zerick (57) ABSTRACT

A Simulator and a simulating method for running a guest program in a host are disclosed. The simulator includes: an initialization device configured for setting content of a hypervisor page table in the host, the hypervisor page table mapping a guest physical address space to a host physical address space. The simulator further includes a binary translation device configured for employing a program logical address to perform a memory access in code translation. The simulator also includes a miss handling device configured for updating a guest translation look-aside buffer by treating a miss in a host translation look-aside buffer caused by the execution of the translated code as a miss in the guest translation look-aside buffer, wherein the host translation look-aside buffer is configured to buffer entries for mapping addresses in a guest program logical address space to addresses in the guest physical address space. The simulator further includes an update tracing device configured for, in response to the update to the guest translation look-aside buffer, perform the update to the host translation look-aside buffer. Also disclosed is a method for running a guest program in a host.

13 Claims, 5 Drawing Sheets

FIG. 1

Instruction of a guest program:    stw r20, 24(r21)

INPUT:

--- host instruction after binary translation of the prior art step1: calculating guest program logical address Guest_LA=r21+24
step2: calculating guest physical address Guest_PA=TLB_translate(Guest_LA)
step3: store HostMem[Guest_PA]=r20

--- host instruction after binary translation according to an embodiment of the invention step1: calculating guest program logical address Guest_LA=r21+24
step2: store HostMem[Guest_LA]=r20

SIMULATOR AND SIMULATING METHOD FOR RUNNING GUEST PROGRAM IN HOST

CROSS REFERENCE TO RELATED APPLICATIONS

This application claims priority under 35 U.S.C. §119 from Chinese Patent Application number 200810185788.2, filed on Dec. 10, 2008, the entire contents of which are herein incorporated by reference.

BACKGROUND OF THE INVENTION

There are different instruction-set architectures in the field of computer. Object codes of operation system and application programs compiled for one instruction set architecture may be unable to be executed on a computer based on a different instruction set architecture.

The full system simulator (termed as simulator in the following) runs on a computer (termed as host in the following) based on an instruction set architecture, but can simulate a computer (termed as guest in the following) based on a different instruction set architecture. By means of the simulator, the object codes of operation system and application programs compiled for the guest can be executed on the host, as if they are directly executed on the guest.

Computer software usually accesses memory data based on logical addresses. When the computer executes an instruction accessing the memory, the memory access is finally performed by converting the logical address to the physical address through a memory management unit (MMU). When the software is to be executed, a page table for defining a map from the logical address space to the physical address space is established. Entries of the page table are buffered through a translation look-aside buffer (TLB) to increase the speed. In the following, the address as mentioned refers to that for data access unless specifically pointed out.

To increase the processing speed, the simulator usually adopts the dynamic binary translation technique to translate the guest software into a code sequence based on the host instruction set architecture (called as translated code in the following). In performing the binary translation, the simulator is required to simulate the processing of the MMU in the guest to translate the logical addresses of the guest program to the guest physical addresses (i.e., host logical addresses). When the host executes the translated code, the MMU of the host translates the translated guest physical addresses to host physical addresses.

When the simulator executes the guest program, it is required to translate the guest logical addresses into the guest physical addresses in the process of binary translation. This process greatly reduces the execution efficiency of the simulator.

SUMMARY OF THE INVENTION

An embodiment of the present invention provides a simulator for running a guest program in a host, comprising: an initialization device configured for setting content of a hypervisor page table in the host, the hypervisor page table mapping a guest physical address space to a host physical address space; a binary translation device configured for employing a program logical address to perform a memory access in code translation; a miss handling device configured for updating a guest translation look-aside buffer by treating a miss event (hereinafter also referred to as miss) in a host translation look-aside buffer caused by the execution of the translated code as a miss event (hereinafter also referred to as miss) in the guest translation look-aside buffer, the host translation look-aside buffer buffering entries for mapping addresses in a program logical address space to addresses in the guest physical address space; and an update tracing device configured for, in response to the update to the guest translation look-aside buffer, performing the update to the host translation look-aside buffer.

An embodiment of the present invention provides a simulating method of running a guest program in a host, the simulating method comprising: setting content of a hypervisor page table in the host, the hypervisor page table mapping a guest physical address space to a host physical address space; performing a binary translation, wherein a program logical address is employed in code translation to perform a memory access; updating a guest translation look-aside buffer by treating a miss in a host translation look-aside buffer caused by the execution of the translated code as a miss in the guest translation look-aside buffer, the host translation look-aside buffer buffering entries for mapping addresses in a program logical address space to addresses in the guest physical address space; and in response to the update to the guest translation look-aside buffer, performing the update to the host translation look-aside buffer.

In the embodiments of the present invention, the execution efficiency is increased because the process of simulating the operation of the MMU of the guest to translate the guest logical addresses to the guest physical addresses is omitted in the simulator.

BRIEF DESCRIPTION OF THE DRAWINGS

The above and/or other aspects, features and/or advantages of embodiments of the present invention will be easily appreciated in view of the following description by referring to the accompanying figures. In the accompanying drawings, identical or corresponding technical features or components will be represented with identical or corresponding reference numbers.

DETAILED DESCRIPTION OF EXEMPLARY EMBODIMENTS

Embodiments of the present invention are below described by referring to the drawings. It is to be noted that, for purpose of clarity, representations and descriptions about those components and processes known by those skilled in the art but unrelated to the present invention are omitted in the drawings and the description.

Figure 1:
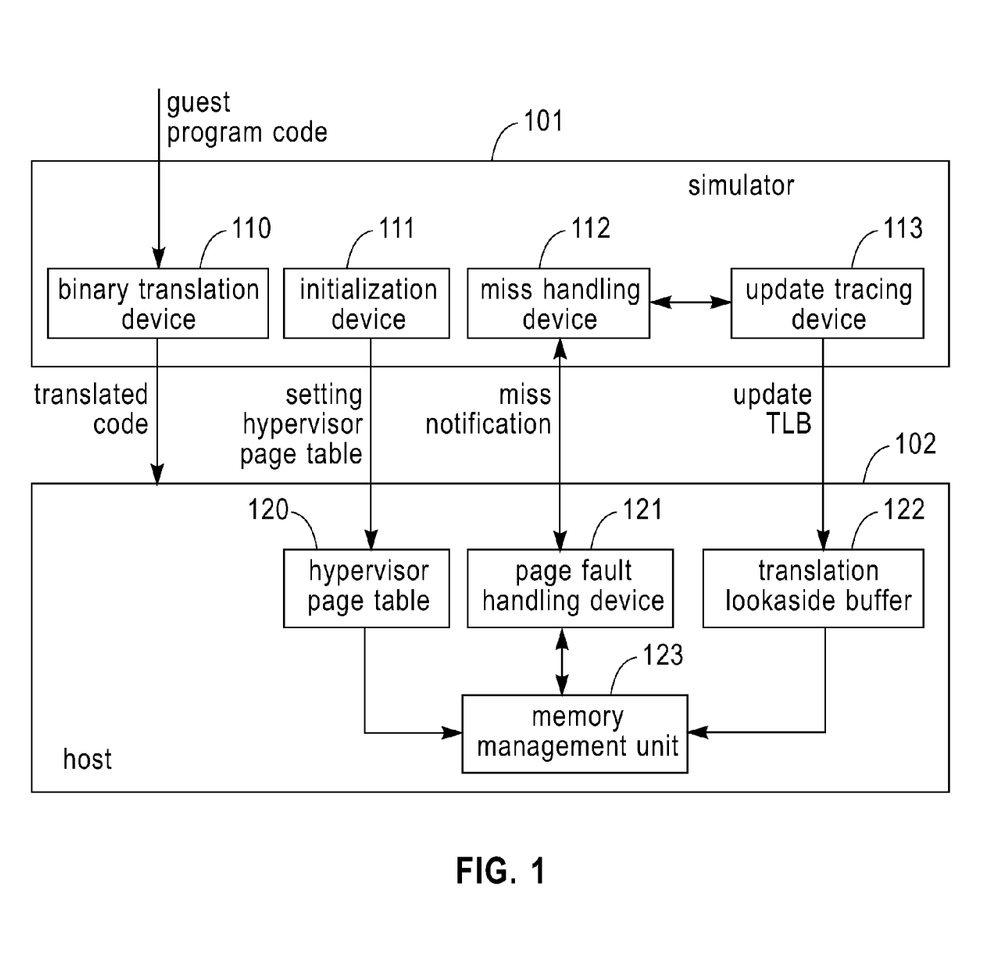
FIG. 1 is a block diagram showing an exemplary structure of a simulator and a host according to an embodiment of the present invention.

FIG. 1 is a block diagram showing an exemplary structure of a simulator and a host according to an embodiment of the present invention.

As shown in FIG. 1, the simulator 101 comprises a binary translation device 110, an initialization device 111, a miss handling device 112 and an update tracing device 113. The host 102 comprises a hypervisor page table 120, a page fault handling device 121, a translation look-aside buffer 122 and a memory management unit 123.

Address Translation Mechanism of the Host

As shown in FIG. 1, the host 102 comprises a translation look-aside buffer 122 and a hypervisor page table 120. As described in the following, the translation look-aside buffer 122 buffers entries for mapping addresses in the logical address space of a program (i.e., the guest program executed by the simulator 101) to that in the guest physical address space. The hypervisor page table 120 maps the guest physical address space to a host physical address space. For example, the hypervisor page table 120 includes entries for mapping addresses in the guest physical address space to that in the host physical address space. Permitted by the capacity, it is possible to implement a complete map in the hypervisor page table 120. Alternatively, it is also possible to store the complete map in the memory and buffer a portion of the complete map by the hypervisor page table 120. It is to be noted that, although the translation look-aside buffer 122 and the hypervisor page table 120 are shown as being separated from the memory management unit 123 in FIG. 1, it is also possible to partially or completely incorporate them in the memory management unit 123 in dependence upon specific implementations.

As described in the following, the host 102 can execute a translated code of the guest program. When the host 102 executes the code involving memory access, the program logical address involved in the memory access is transmitted to the memory management unit 123, and the memory management unit 123 generates a corresponding host physical address and puts the address on the addresses lines, so that the host 102 can address the memory location indicated by the host physical address. The memory management unit 123 converts the program logical address to the corresponding host physical address by using the translation look-aside buffer 122 and the hypervisor page table 120. For example, the memory management unit 123 locates the mapping relation (for example, map entry) for corresponding the program logical address to the guest physical address from the translation look-aside buffer 122 and obtains the corresponding guest physical address according to this mapping relation. Then, the memory management unit 123 converts the guest physical address to the host physical address according to the mapping relation in the hypervisor page table 120.

If the entry for the received guest logical address cannot be found in the translation look-aside buffer 122, i.e., a miss occurs, the page fault handling device 121 is informed.

If the mapping relation for the obtained guest physical address cannot be found in the hypervisor page table 120 (in case that the hypervisor page table 120 only buffers a part of mapping relations), the desired mapping relation is found from the memory and is swapped into the hypervisor page table 120.

Preferably, the translation look-aside buffer 122 and the hypervisor page table 120 may be implemented through hardware, and thus automatically perform the conversion from the program logical address to the guest physical address and then to the host physical address.

In case that the translation look-aside buffer 122 and the hypervisor page table 120 are not only used for the translated code, the memory management unit 123 has to determine whether the received program logical address belongs to the translated code, so as to perform a correct address translation through the translation look-aside buffer 122 and the hypervisor page table 120. Various techniques may be used to achieve this object. In an example, it is possible to distinguish the simulator 101 and the translated code through an execution status. For example, when the code of the simulator 101 itself is running, the execution status is switched to a hypervisor status; when the translated code is running, the execution status is switched to a guest status. In another example, it is possible to allocate different process identifiers to the simulator 101 and the translated code, wherein the process identifier for the translated code is that having a specified characteristic representing the translated code. It is possible to distinguish the maps involving the translated code in the translation look-aside buffer 122 and the hypervisor page table 120 through a tag (for example, process identifier, status) technique.

Initialization Mechanism

Those skilled in the related art know that when the simulator 101 is to be executed, the operation system of the host 102 allocates a logical address space and initializes the page table for the simulator 101. The page table records a map from the logical address space of the simulator 101 to the host physical address space. When the simulator 101 starts to run, various characteristics of the guest are initialized, including allocate a portion of space from the logical address space of the simulator 101 as the physical address space of the guest. When a guest program is to be executed by the simulator 101, the simulator 101 allocates a logical address space for the guest program, and prepares a page table with respect to the guest program for the translation look-aside buffer of the memory management unit in the simulated guest, to map the logical address space of the guest program to the guest physical address space. Of course, in case of allowing the guest program to dynamically request for memory, the map from the logical address space of the guest program to the guest physical address space may change.

When a guest program is to be loaded for execution by the simulator 101, the initialization device 111 sets the content of the hypervisor page table 120. Specifically, the initialization device 111 sets a mapping relation from the guest physical address space (i.e., the space allocated by the simulator 101 from its logical address space as the guest's physical memory) to the host physical address space in the hypervisor page table 120. Permitted by the capacity, it is possible to set a complete map in the hypervisor page table 120. Alternatively, it is also possible to store the complete map in the memory and buffer a portion of the complete map by the hypervisor page table 120. In the latter case, it is possible to detect and handle page faults in the hypervisor page table 120 by the host 102.

In the above embodiments, it is assumed that the guest physical address is consistent with the simulator's logical address. In case that the guest physical address is not consistent with the simulator's logical address, it is possible to convert the guest physical address to the simulator's logical address according to a predetermined mapping rule in setting the hypervisor page table 120, and consider the converted logical address of the simulator as the guest physical address involved in the mapping relation of the hypervisor page table 120.

Dynamic Binary Translation

In executing the guest program, the simulator 101 translates the object codes of the guest program on a segment basis or entirely into a code sequence based on the host instruction set architecture and delivers it to the host for execution. The binary translation device 110 is responsible for such a translation, wherein the program logical address is employed to perform memory access in the translated code.

Figure 2:
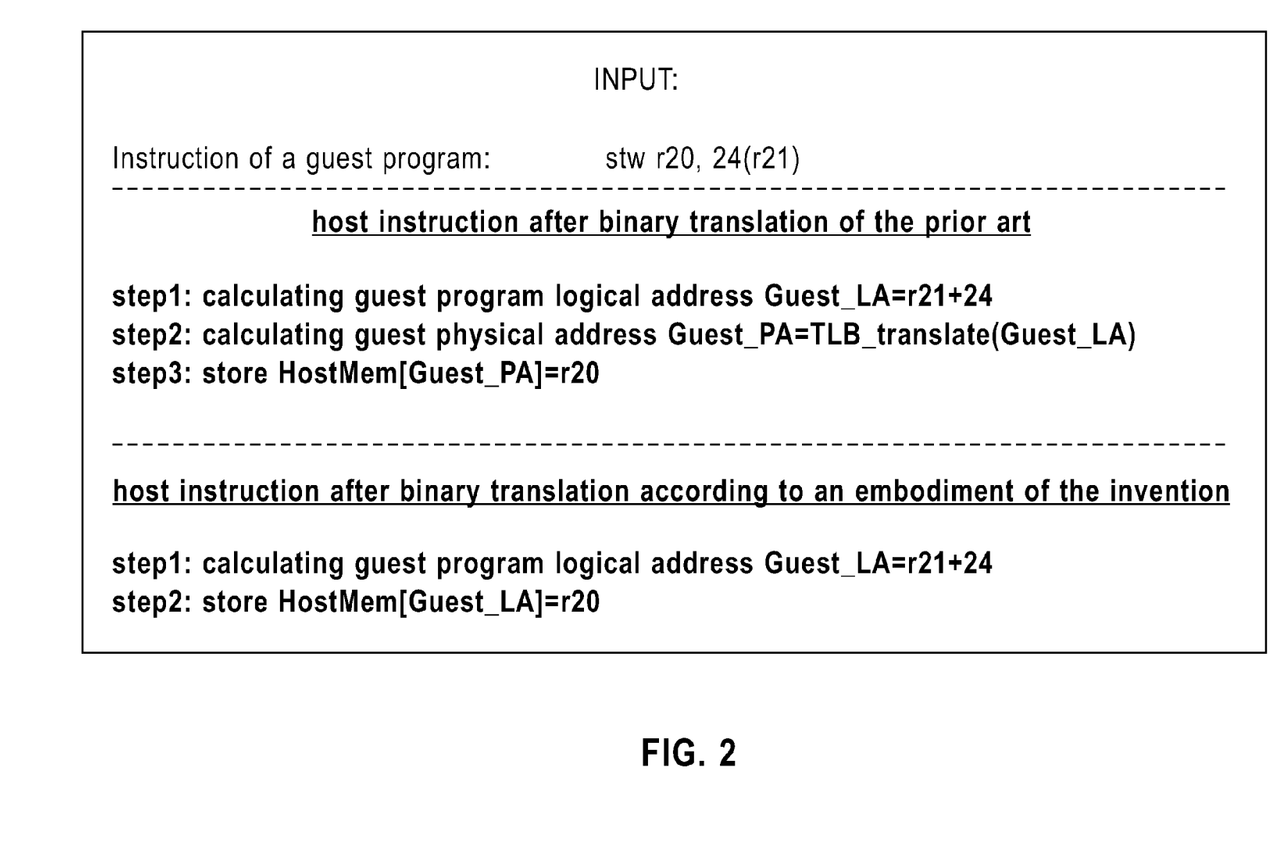
FIG. 2 shows the translation process of a binary translation device according to an embodiment of the present invention by comparison with the prior art.

FIG. 2 shows the translation process of a binary translation device according to an embodiment of the present invention by comparison with the prior art.

FIG. 2 shows an instruction "stw r20, 24 (r21)" of a guest program, which involves memory access, with the semantic of storing the content of a register r20 at a (logical) memory location indicated by the address obtained by adding the content of a register r21 with 24. As shown in FIG. 2, according to the binary translation process of the prior art, the instruction is translated into a host instruction sequence including three steps. The first step is calculating a guest program logical address Guest_LA=r21+24. The second step is calculating a guest physical address Guest_PA=TLB_translate (Guest_LA), wherein TLB_translate is a function call for simulating the function of the guest's memory management unit to obtain the guest physical address Guest_PA (i.e., simulator logical address) corresponding to Guest_LA. The third step is storing the content of the register r20 at an address HostMem [Guest_PA] (HostMem represents the address translation by the host). As shown in FIG. 2, in the host instruction sequence translated by the binary translation device 110 according to an embodiment of the invention, only two steps are included, i.e., the step of calculating the guest program logical address Guest_LA=r21+24, and the step of storing the content of the register r20 at the address HostMem [Guest_LA]. As compared with the instruction sequence of the prior art, the second step in the instruction sequence of the prior art, i.e., the step of calculating the guest physical address Guest_PA=TLB_translate (Guest_LA) is omitted, increasing the efficiency of binary translation.

Although FIG. 2 only shows an example of store, the binary translation device 110 according to the embodiment of the present invention may also applicable to the cases involving load.

Maintenance of the Translation Look-Aside Buffer

When the simulator 101 starts to execute a guest program or during the simulator 101 executes the guest program, with respect to a memory access instruction currently executed by the host in the translated code, the guest translation look-aside buffer and the host translation look-aside buffer may include no entry involving the program logical address to be accessed by the memory access instruction. In this case, a miss occurs and the execution of the current instruction is interrupted, and the page fault handling device 121 is informed of a page fault about the miss. The page fault handling device 121 may be informed through various ways, for example, through a page fault interrupt, through a notification signal from the memory management unit 123 or the translation look-aside buffer 122, directly invoked by the module detecting the miss.

The page fault handling device 121 may identify the miss in the translation look-aside buffer caused by the execution of the translated code according to the characteristics of the translated code (for example, a process identifier having a specified characteristic or a specific execution status and the like), and inform the simulator 101 to configure the translation look-aside buffer 122 to handle the miss.

In the simulator 101, the notification from the page fault handling device 121 is handled by the miss handling device 112. The miss handling device 112 updates the guest translation look-aside buffer by considering the miss in the translation look-aside buffer 122 caused by the execution of the translated code as the miss in the guest translation look-aside buffer. That is to say, when the miss handling device 112 is informed of the miss occurred in the translation look-aside buffer 122, it is also considered that the required entry for mapping the program logical address to be accessed by the current memory access instruction to the guest physical address does not exist in the guest translation look-aside buffer. Accordingly, the miss handling device 112 takes the required entry from the guest's page table to the guest translation look-aside buffer. In case that there is free space in the guest translation look-aside buffer, it is possible to directly place the required entry at the free location; otherwise, it is possible to swap out an entry in the guest translation look-aside buffer according to a predetermined policy and replace it with the required entry.

As described earlier, the miss handling device 112 is responsible for updating the guest translation look-aside buffer. In response to the update to the guest translation look-aside buffer, the update tracing device 113 performs the same update to the host translation look-aside buffer 122. That is to say, if an entry is added in the guest translation look-aside buffer, the update tracing device 113 adds the same entry to the translation look-aside buffer 122. If an entry is swapped out from the guest translation look-aside buffer, the update tracing device 113 swaps out the same entry from the translation look-aside buffer 122. Through the processing of the miss handling device 112 and the update tracing device 113, entries involving the translated code are kept in synchronization between the guest translation look-aside buffer and the host translation look-aside buffer 122.

Accordingly, after the update tracing device 113 finally handles the miss, the interrupted execution of the current instruction is recovered.

When the simulator 101 starts to execute the guest program, the guest translation look-aside buffer and the host translation look-aside buffer 122 may include no entry for the translated code. To increase the efficiency, however, it is possible to set some of entries as initial values in the guest translation look-aside buffer by the simulator 101 according to a predetermined predicting policy when generating the page table for the guest program. In response to the setting of the initial values for the guest program in the guest translation look-aside buffer, the update tracing device 113 performs the same setting of the initial values to the content for the program in the host translation look-aside buffer 122, i.e., setting the same entries as the initial values in the translation look-aside buffer 122.

In the execution of the guest program, if the guest is allowed to dynamically request memory allocation, or in case of allowing other dynamic memory adjustment or clearing, the content of entries for the guest program in the guest page table may change. If the entry corresponding to a changed entry is currently buffered in the guest translation look-aside buffer and the host translation look-aside buffer 122, the simulator 101 flushes the corresponding entry currently buffered in the guest translation look-aside buffer and the host translation look-aside buffer 122 with the changed entry to avoid an error of address translation. In this case, in response to modifications to the entries in the page table according to predetermined events, i.e., dynamic memory allocation, adjustment, clearing and the like, the update tracing device 113 performs the same flush to the content for the program in the host translation look-aside buffer as that to the content for the guest program in the guest translation look-aside buffer. The update tracing device 113 may know such a flush in the guest translation look-aside buffer through various ways. For example, it is possible to know from the module for flushing in the simulator 101, or from the interrupt involving the flush simulated by the simulator 101, and so on.

It is possible to associate the page fault handling device 121 of the host 102 with the miss handling device 112 of the simulator 101 through various ways. For example, it is possible to register the miss handling device 112 with the host 102 by the initialization device 111, so that the host 102 (for example, page fault handling device 121) can initiate the miss handling device 112 upon detecting the miss in the host translation look-aside buffer 122 caused by the execution of the translated code. In this case, the host may include a register device (not shown) for accepting the register of the simulator 101 so as to inform the simulator 102 of the miss.

The register device may be implemented through various ways. For example, the operation system of the host 102 may act as the register device which specifies a specific linkable module as the module to be invoked upon detecting the miss in the host translation look-aside buffer 122 caused by the execution of the translated code, wherein the processing logic of the miss handling device 112 is implemented in the module. Alternately, it is possible to set the miss handling device 112 as the interrupt processing routine of the host 102, and the page fault handling device 121 generates a corresponding interrupt upon detecting the miss in the host translation look-aside buffer 122 caused by the execution of the translated code. In this case, the interrupt management system of the operation system may act as the register device. Alternately, it is possible to provide the handler for the miss handling device 112 to the page fault handling device 121 of the host 102 so as to be invoked directly. In this case, the module of the operation system for accepting and managing the process handler may act as the register device.

Simulating Method

Figure 3:
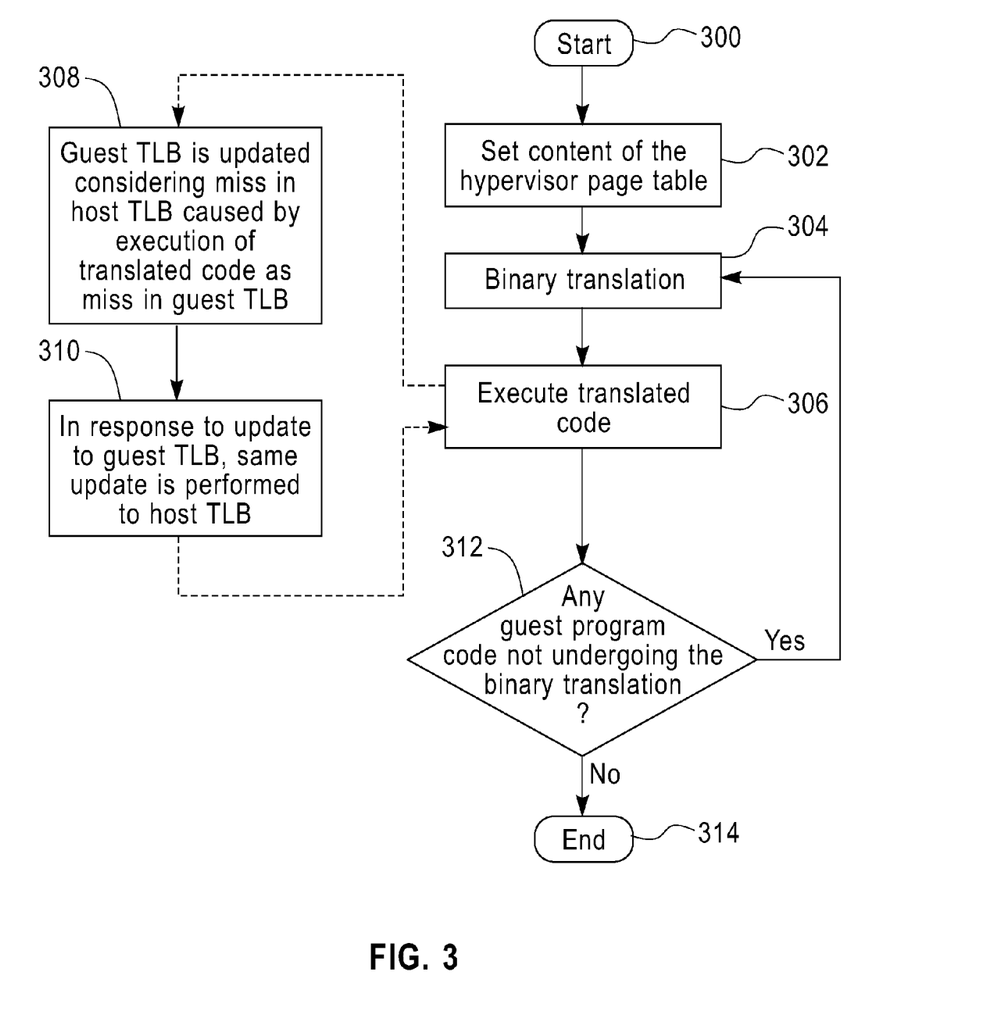
FIG. 3 show the flow chart of a simulating method of running a guest program in a host according to an embodiment of the present invention.

FIG. 3 shows the flow chart of a simulating method of running a guest program on a host according to the embodiment of the present invention, wherein the host may be the host 102 as shown in FIG. 1.

As shown in FIG. 3, the simulating method starts from step 300. At step 302, the content of the hypervisor page table is set. Specifically, the mapping relation from the guest physical address space to the host physical address space is set in the hypervisor page table. Permitted by the capacity, it is possible to set a complete map in the hypervisor page table. Alternatively, it is also possible to store the complete map in the memory and buffer a portion of the complete map by the hypervisor page table.

In the above embodiments, it is assumed that the guest physical address is consistent with the simulator's logical address. In case that the guest physical address is not consistent with the simulator's logical address, it is possible to convert the guest physical address to the simulator's logical address according to a predetermined mapping rule in setting the hypervisor page table, and consider the converted logical address of the simulator as the guest physical address involved in the mapping relation of the hypervisor page table.

At step 304, the binary translation is performed, wherein the program logical address is employed to perform memory access in the translated code. The object codes of the guest program may be translated on a segment basis or entirely into a code sequence based on the host instruction set architecture and delivered to the host for execution. An example of the binary translation of step 304 is as described in the above by referring to FIG. 2. Although FIG. 2 only shows an example of store, the binary translation according to the embodiment of the present invention may also applicable to the cases involving load.

At step 306, the translated code is executed. When a guest program initially starts to be executed or during the guest program is executed, with respect to a memory access instruction currently executed by the host in the translated code, the guest translation look-aside buffer and the host translation look-aside buffer may include no entry involving the program logical address to be accessed by the memory access instruction. In this case, a miss occurs and the execution of the current instruction is interrupted.

If the miss in the host translation look-aside buffer caused by the execution of the translated code occurs in executing the translated code, at step 308, the guest translation look-aside buffer is updated by considering the miss in the host translation look-aside buffer caused by the execution of the translated code as the miss in the guest translation look-aside buffer. That is to say, when the miss occurs in the host translation look-aside buffer, it is also considered that the required entry for mapping the program logical address to be accessed by the current memory access instruction to the guest physical address does not exist in the guest translation look-aside buffer. Accordingly, the required entry is taken from the guest's page table to the guest translation look-aside buffer. In case that there is free space in the guest translation look-aside buffer, it is possible to directly place the required entry at the free location; otherwise, it is possible to swap out an entry in the guest translation look-aside buffer according to a predetermined policy and replace it with the required entry.

At step 310, in response to the update to the guest translation look-aside buffer, the same update is performed to the host translation look-aside buffer. That is to say, if an entry is added in the guest translation look-aside buffer, the same entry is added to the host translation look-aside buffer. If an entry is swapped out from the guest translation look-aside buffer, the same entry is swapped out from host translation look-aside buffer. Through the processing of steps 308 and 310, entries involving the translated code are kept in synchronization between the guest translation look-aside buffer and the host translation look-aside buffer.

Accordingly, after the miss is finally handled, the interrupted execution of the current instruction is recovered. Upon completing the execution of the translated code, at step 312, a determination is performed as to whether there is any guest program code not undergoing the binary translation. If there is no guest program code undergoing the binary translation, the method ends at step 314. If there is any guest program code undergoing the binary translation, the method returns to step 304.

When starting to execute the guest program, the guest translation look-aside buffer and the host translation look-aside buffer may include no entry for the translated code. To increase the efficiency, however, it is possible to set some of entries as initial values in the guest translation look-aside buffer according to a predetermined predicting policy when generating the page table for the guest program. Accordingly, the simulating method may comprise in response to the setting of the initial values for the guest program in the guest translation look-aside buffer, performing the same setting of the initial values to the content for the program in the host translation look-aside buffer, i.e., setting the same entries as the initial values in the translation look-aside buffer.

In the execution of the guest program, if the guest is allowed to dynamically request memory allocation, or in case of allowing other dynamic memory adjustment or clearing, the content of entries for the guest program in the guest page table may change. If the entry corresponding to a changed entry is currently buffered in the guest translation look-aside buffer and the host translation look-aside buffer, the corresponding entry currently buffered in the guest translation look-aside buffer and the host translation look-aside buffer is flushed with the changed entry to avoid an error of address translation. In this case, the simulating method may comprise in response to modifications to the entries in the page table according to predetermined events, i.e., dynamic memory allocation, adjustment, clearing and the like, the same flush is performed to the content for the program in the host translation look-aside buffer as that to the content for the guest program in the guest translation look-aside buffer.

The simulating method may comprise registering the step 308 of updating the guest translation look-aside buffer with the host, so that the host can initiate the step 308 of updating the guest translation look-aside buffer upon detecting the miss in the host translation look-aside buffer caused by the execution of the translated code. The registering may be implemented through various ways. For example, the operation system of the host may specify a specific linkable module as the module to be invoked upon detecting the miss in the host translation look-aside buffer caused by the execution of the translated code, wherein the processing logic of step 308 is implemented in the module. Alternately, it is possible to implement step 308 as the interrupt processing routine of the host, and a corresponding interrupt is generated upon detecting the miss in the host translation look-aside buffer caused by the execution of the translated code. Alternately, it is possible to provide the handler of the process for implementing step 308 to the host so as to be invoked directly.

Method of Running the Simulator

Figure 4:
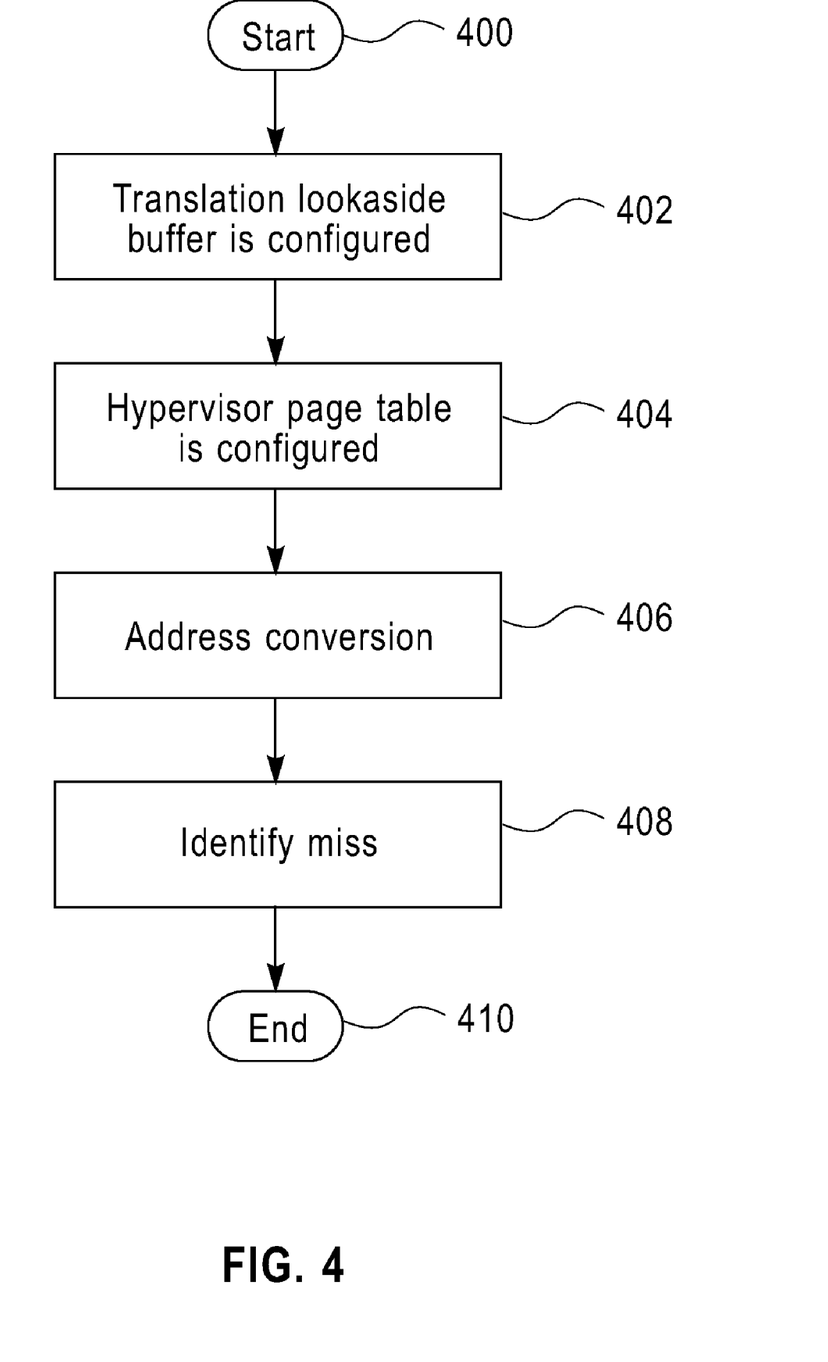
FIG. 4 show the flow chart of a method of running a simulator in a host according to an embodiment of the present invention.

FIG. 4 show the flow chart of a method of running a simulator in a host according to an embodiment of the present invention.

As shown in FIG. 4, the method starts from step 400. At step 402, the host translation look-aside buffer is configured by the simulator as buffering entries for mapping the address in the program logical address space to that in the guest physical address space. As described in the above by referring to step 308 and step 310, both of FIG. 3, the simulator configures the host translation look-aside buffer.

At step 404, the host hypervisor page table is configured by the simulator as mapping the guest physical address space to the host physical address space. As described in the above by referring to step 302 of FIG. 3, the simulator configures the host translation look-aside buffer.

At step 406, by using the host translation look-aside buffer and the host hypervisor page table, memory addresses in the translated code of program obtained through the simulator's binary translation are converted to corresponding host physical addresses. As described above at FIG. 1, the host translation look-aside buffer buffers entries for mapping the addresses in the logical address space of the guest program to that in the guest physical address space. The host hypervisor page table maps the guest physical address space to the host physical address space. It is possible to find entries for corresponding the program logical addresses to the guest physical addresses from the host translation look-aside buffer and obtain corresponding guest physical addresses according to the entries. Then, the guest physical addresses are converted to the host physical addresses according to the mapping relation in the host hypervisor page table.

At step 408, the miss in the translation look-aside buffer caused by the execution of the translated code is identified and the simulator is informed to configure the translation look-aside buffer. When the simulator starts to execute a guest program or during the simulator executes the guest program, with respect to a memory access instruction currently executed by the host in the translated code, the guest translation look-aside buffer and the host translation look-aside buffer may include no entry involving the program logical address to be accessed by the memory access instruction. In this case, a miss occurs and the execution of the current instruction is interrupted. It is possible to identify the miss in the translation look-aside buffer caused by the execution of the translated code according to the characteristics of the translated code (for example, a process identifier having a specified characteristic or a specific execution status and the like), and inform the simulator to configure the host translation look-aside buffer to handle the miss.

The method ends at step 410. It is to be noted that although step 402, step 404, step 406 and step 408 are shown sequentially in FIG. 4, this does not represent any limit to the execution sequence of these steps. These steps may be executed in any sequence, and one or some of the steps may be executed repeatedly.

The method as shown in FIG. 4 may also comprise accepting the registering of the simulator so as to perform the notification of step 408 to the simulator.

Figure 5:
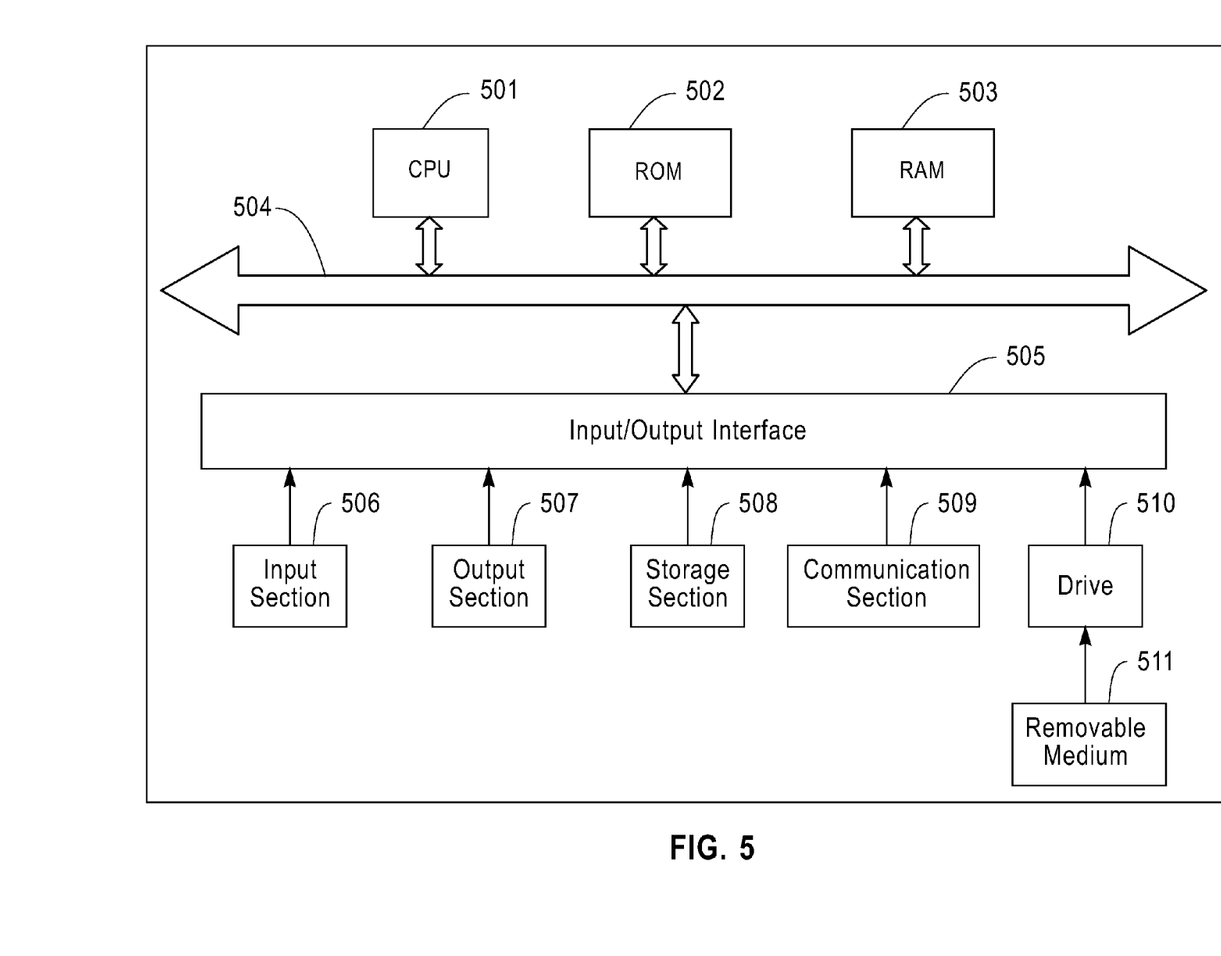
FIG. 5 is a block diagram showing the exemplary structure of a computer for implementing the present invention.

An environment for implementing the apparatus and the method of the present invention is as shown in FIG. 5.

In FIG. 5, a central processing unit (CPU) 501 performs various processes in accordance with a program stored in a read only memory (ROM) 502 or a program loaded from a storage section 508 to a random access memory (RAM) 503. In the RAM 503, data required when the CPU 501 performs the various processes or the like is also stored as required.

The CPU 501, the ROM 502 and the RAM 503 are connected to one another via a bus 504. An input/output interface 505 is also connected to the bus 504.

The following components are connected to the input/output interface 505: an input section 506 exemplarily including a keyboard, a mouse, or the like; an output section 507 exemplarily including a display such as a cathode ray tube (CRT), a liquid crystal display (LCD), or the like, and a loudspeaker or the like; The storage section 508 exemplarily including a hard disk or the like; and a communication section 509 exemplarily including a network interface card such as a LAN card, a modem, or the like. The communication section 509 performs a communication process via the network such as the internet.

A drive 510 is also connected to the input/output interface 505 as required. A removable medium 511, such as a magnetic disk, an optical disk, a magneto-optical disk, a semiconductor memory, or the like, is mounted on the drive 510 as required, so that a computer program read there from is installed into the storage section 508 as required.

In the case where the above-described steps and processes are implemented by the software, the program that constitutes the software is installed from the network such as the internet or the storage medium such as the removable medium 511.

One skilled in the art should note that, this storage medium is not limit to the removable medium 511 having the program stored therein as illustrated in FIG. 5, which is delivered separately from the apparatus for providing the program to the user. Examples of the removable medium 511 include the magnetic disk, the optical disk (including a compact disk-read only memory (CD-ROM) and a digital versatile disk (DVD)), the magneto-optical disk (including a mini-disk (MD)), and the semiconductor memory. Alternatively, the storage medium may be the ROM 502, the hard disk contained in the storage section 508, or the like, which have the program stored therein and is delivered to the user together with the device containing them.

The present invention is described in the above by referring to specific embodiments. One skilled in the art should understand that various modifications and changes can be made without departing from the scope as set forth in the following claims.

What is claimed is:

1. A simulator for running a guest program in a host, the simulator comprising:
   an initialization device configured to set content of a hypervisor page table in the host, wherein the hypervisor page table is configured to map a guest physical address space to a host physical address space;
   a binary translation device configured to employ a program logical address to perform a memory access in code translation;
   a miss handling device configured to perform an update to a guest translation look-aside buffer by treating a miss in a host translation look-aside buffer caused by execution of translated code as a miss in the guest translation look-aside buffer, wherein the host translation look-aside buffer is configured to buffer entries for mapping addresses in a program logical address space to addresses in the guest physical address space;
   an update tracing device configured to update the host translation look-aside buffer in response to the update to the guest translation look-aside buffer by the miss handling device;
   wherein the update tracing device is further configured to:
   in response to setting an initial value to the guest program in the guest translation look-aside buffer, set the initial value to content for the guest program in the host translation look-aside buffer; and
   wherein the update tracing device is further configured to:
      in response to a flush of the content for the guest program in the guest translation look-aside buffer according to a predetermined event, perform the flush of the content for the guest program in the host translation look-aside buffer.

2. The simulator according to claim 1, wherein the initialization device is further configured to:
   register the miss handling device with the host.

3. The simulator according to claim 2, wherein the host is configured to:
   initiate the registered miss handling device, in response to detecting the miss in the host translation look-aside buffer caused by the execution of the translated code.

4. The simulator according to claim 1, wherein the host translation look-aside buffer is implemented on hardware.

5. The simulator according to claim 1, wherein the hypervisor page table is implemented on hardware.

6. A simulating method of running a guest program in a host, the method comprising:
   setting content of a hypervisor page table in the host, the hypervisor page table mapping a guest physical address space to a host physical address space;
   performing a binary translation, wherein a program logical address is employed in code translation to perform a memory access;
   updating a guest translation look-aside buffer by treating a miss in a host translation look-aside buffer, the miss being caused by execution of translated code as a miss in the guest translation look-aside buffer, the host translation look-aside buffer being configured to buffer entries for mapping addresses in a program logical address space to addresses in the guest physical address space; and
   updating the host translation look-aside buffer, in response to updating the guest translation look-aside buffer;
   in response to setting an initial value to the guest program in the guest translation look-aside buffer, setting the initial value to the content for the guest program in the host translation look-aside buffer; and
   in response to a flush of the content for the guest program in the guest translation look-aside buffer according to a predetermined event, flushing the content for the guest program in the host translation look-aside buffer.

7. The simulating method according to claim 6, further comprising:
   registering the step of updating the guest translation look-aside buffer with the host.

8. The simulating method according to claim 7, further comprising:
   initiating the registered step of updating the guest translation look-aside buffer, in response to detecting the miss in the host translation look-aside buffer caused by the execution of the translated code, wherein the step of initiating is performed by the host.

9. The simulating method according to claim 6, wherein the host translation look-aside buffer and the hypervisor page table are implemented based on hardware.

10. A simulator for executing a guest program in a host, the simulator comprising:
   an initialization device configured to set content of a hypervisor page table in the host;
   a binary translation device configured to perform a memory access in code translation;
   a miss handling device configured to update a guest translation look-aside buffer by treating a miss event in a host translation look-aside buffer as a miss event in the guest translation look-aside buffer; and
   an update tracing device configured to update the host translation look-aside buffer in response to updating the guest translation look-aside buffer;
   wherein the update tracing device is further configured to:
   set an initial value to content for the guest program in the host translation look-aside buffer, in response to setting the initial value to the guest program in the guest translation look-aside buffer; and
   wherein the update tracing device is further configured to:
      flushing content for the guest program in the host translation look-aside buffer, in response to a flush of the content for the guest program in the guest translation look-aside buffer according to a predetermined event.

11. The simulator according to claim 10, wherein the initialization device is further configured to register the miss handling device with the host.

12. The simulator according to claim 11, wherein the host is configured to initiate the registered miss handling device, in response to detecting the miss event in the host translation look-aside buffer caused by the execution of the translated code.

13. The simulator according to claim 10, wherein the host translation look-aside buffer and the hypervisor page table are implemented based on hardware.

* * * * *